Patented May 27, 1941

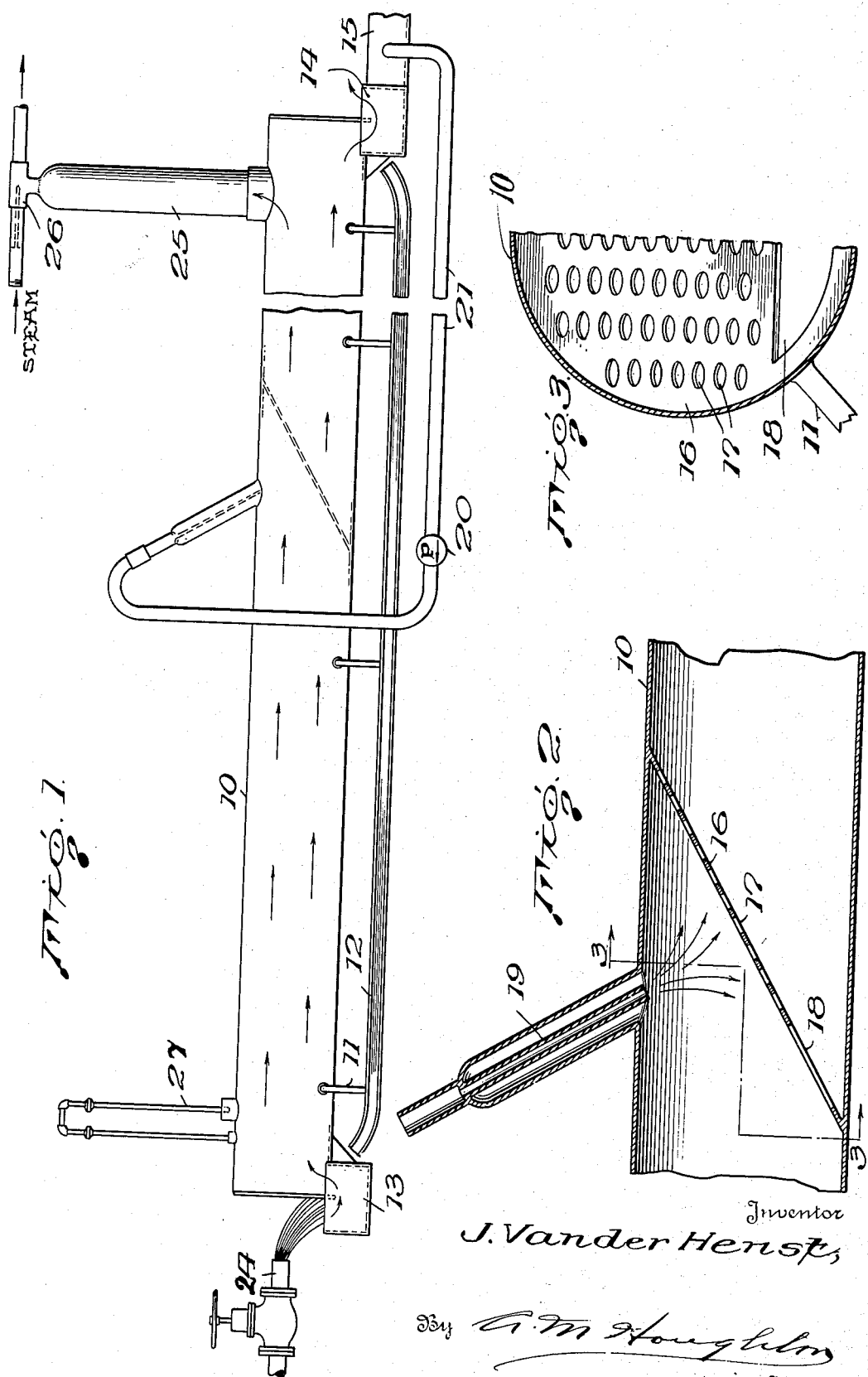

2,243,176

UNITED STATES PATENT OFFICE 2,243,176

DEGASSING MACHINE

Jan Vander Henst, Houston, Tex., assignor to Gulf Oil Corporation, Pittsburgh, Pa., a corporation of Pennsylvania Application October 14, 1940, Serial No. 361,159

3 Claims. (Cl. 183—2.5)

This invention or discovery relates to degassing machines; and it comprises in a machine for freeing drilling muds and other viscous liquids of dissolved and entrained gases and light volatiles, an elongated substantially horizontal enclosed chamber provided with a liquid inlet at one end and an outlet at the other, means for delivering a flow of liquid to the chamber, an inclined perforated baffle in the chamber through which the liquid passes, means for putting the chamber under subatmospheric pressure and nozzle means for squirting a jet of liquid into the flow of liquid adjacent the baffle to agitate and expose large surfaces of the flowing liquid for extrication of gas; all as more fully hereinafter set forth and as claimed.

In drilling wells, mud or other drilling fluid is circulated down the drill pipe, around the drill and up through the annular space between the pipe and the bore. Usually the mud is a clay mud, with the density increased if necessary by additions of heavy materials such as barytes. The mud lubricates and cools the drill and carries up rock cuttings, and serves as a hydraulic loading column to keep gas from entering the well from gas formations penetrated by the drill. This last function is particularly important. Its successful carrying out depends on maintenance of the mud at proper density. Mud leaving the well is ordinarily treated by settling, screening, agitation and other procedures to free it of rock chips and sand and to assist in extrication of gas dissolved or entrained in the mud. Sometimes the mud is put under subatmospheric pressure to facilitate release of gas. It is desired to send the mud back to the well in a condition as near free from foreign matter as possible. It is especially important to free the mud of as much gas as possible. Gassy mud has a lower sensity (pounds per gallon) than gas-free mud, and if sent back to the well imposes a lower back pressure on the gas formations, thereby allowing more gas to escape into the mud.

In a prior Patent 2,142,270 I have disclosed a mud reclaiming apparatus which has proved quite suitable for freeing muds of gas and light volatiles. The present invention is an improvement on the apparatus of this prior patent.

The machine of the present invention takes the form of an elongated chamber or barrel, sealed from the air and adapted to receive a flow of mud. Midway of the chamber is an inclined perforated baffle through which the mud stream flows. The baffle serves to agitate the mud and break up streamline flow. A pressure jet of cleaned mud is directed on the flow of mud just upstream of the baffle in the direction of flow. The jet increases the agitation and helps circulate the mud through the chamber. An evacuator or exhauster is mounted near the outlet end of the chamber, to assist in extrication of gases and to aid in moving the mud along. The combined circulating effect of the jet and of the evacuator is sufficient so that I can dispense with any positive circulation means, with consequent saving in power cost and attainment of simplicity. My apparatus need contain no moving parts at all. The machine achieves results equal to those attained with certain much more complicated apparatus at present in use.

In the accompanying drawing there is shown more or less diagrammatically an example of a specific embodiment of apparatus within the purview of the invention. In the drawing, Fig. 1 is a view of the machine in side elevation, Fig. 2 is a fragmentary view in central vertical section of the portion of the machine containing the baffle and Fig. 3 is a half-section taken along line 3—3 of Fig. 2, showing the baffle construction.

Referring to the drawing, the apparatus includes a horizontally elongated cylindrical vessel or chamber 10 mounted by struts 11 on skids 12 for portability. At one end is a goose-neck trap 13 receiving a flow of mud from a pipe 24 and at the other end is a goose-neck trap 14 shown as delivering to a trough 15. About midway of the chamber is a baffle 16, perforated as at 17 in its upper part and open at 18 in its lower part for unhindered circulation of mud along the bottom of the chamber. Any rock cuttings, clods, etc. in the mud flow readily through this opening. A nozzle 19 is arranged to project a jet of treated (gas-free) mud on the baffle, as shown, under pressure of a pump 20 which draws treated mud from trough 15 through a conduit 21. The nozzle can be supplied with untreated mud if desired. Near the outlet end is an upright bell or dome 25, high enough so that mud will not rise to its top even at the highest degrees of vacuum employed, and fitted with vacuum producing means; conveniently a steam jet exhauster 26 of known type, supplied with high pressure steam or air from a suitable source, not shown. The chamber is fitted with a manometer 27 adjacent the inlet end.

The machine is embodied in any suitable material such as steel and is conveniently assembled by welding. A chamber of dimensions two by thirty feet is a convenient size.

In operation, mud from the well, advantageously after it has been subjected to a settling operation to remove rock cuttings, is supplied to the chamber as shown. Even though the chamber is mounted level the mud flows along at a suitable rate under the combined influence of the agitator jet and of the suction device at the outlet end. The inlet end can be elevated if desired. The agitator jet in cooperation with the baffle stirs up the mud and sprays it around, materially assisting in the extrication of gas and light volatiles. These are drawn off at 26 and may be wasted or recovered as desired. The level of the mud in the chamber (not shown) is higher than the level in the inlet and outlet traps, to an extent proportional to the subatmospheric pressure applied to the chamber. The mud may fill the chamber nearly to the top.

In practice the machine serves the intended function well, reducing the gas and light gasoline content of muds to a negligible value by a single passage through the chamber. The effluent mud is sent back to the well.

While the machine has been described primarily in connection with muds it is also useful in freeing other liquids of gases and relatively volatile liquids, for example, in freeing crude oil of gas and high gravity gasoline. In such use, treated oil is supplied to the agitator jet and the vacuum is produced by a vacuum pump or the like, with recovery of the extracted volatiles.

What I claim is:

1. In a machine of the class described, an elongated substantially horizontal enclosed chamber adapted to contain a flowing body of liquid filling it to a level below the top, liquid inlet means adjacent one end thereof and outlet means adjacent the other end, a foraminous transverse baffle within the chamber inclined away from vertical in the direction of the outlet means, nozzle means opposed to the upwardly presented baffle face, for squirting a jet of liquid into the flow of liquid adjacent the baffle, in the direction of movement of the liquid, whereby to move the liquid toward the outlet means and to break up and agitate the liquid in the chamber and means for putting the interior of the chamber under subatmospheric pressure.

2. In a machine of the class described an elongated enclosed chamber substantially horizontally disposed and adapted to contain a flowing body of liquid partially filling the chamber to a level below the top, a liquid inlet adjacent one end thereof and an outlet adjacent the other end, a foraminous baffle within the chamber inclined backwards from the direction of liquid flow, nozzle means extending into the chamber and arranged to squirt liquid toward the baffle in the direction of liquid flow whereby to urge the liquid from the inlet toward the outlet and means adjacent the outlet and for putting the interior of the chamber under subatmospheric pressure.

3. In a machine of the class described an elongated enclosed chamber substantially horizontally disposed and adapted to contain a flowing body of liquid partially filling the chamber to a level below the top, a liquid inlet adjacent one end thereof and an outlet adjacent the other end, a foraminous baffle within the chamber inclined backwards from the direction of flow, having a relative large and unobstructed opening in its lower part and a plurality of smaller openings in its upper part, nozzle means extending into the chamber and arranged to squirt liquid toward the baffle in the direction of liquid flow whereby to urge the liquid from the inlet toward the outlet and means adjacent the outlet end for putting the interior of the chamber under subatmospheric pressure.

JAN VANDER HENST.